Nov. 10, 1931.  H. E. FOX  1,830,991
WING PIN FITTING
Filed Dec. 30, 1930   6 Sheets-Sheet 2
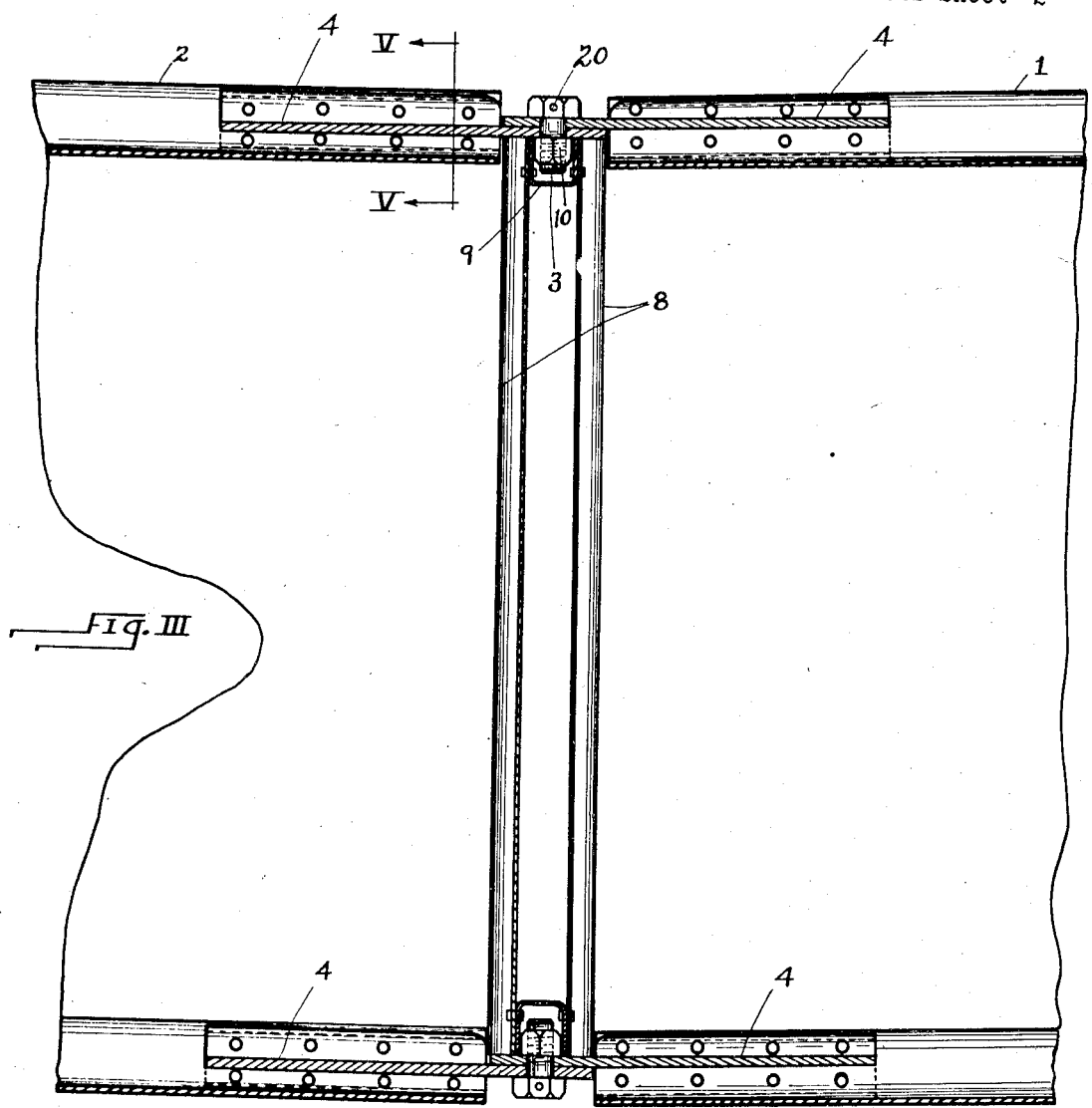
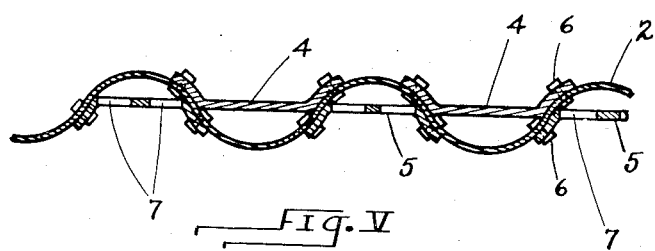
INVENTOR
Harold E. Fox
by Christy Christy and Wharton
his attorneys Nov. 10, 1931.                 H. E. FOX                    1,830,991
                            WING PIN FITTING
                         Filed Dec. 30, 1930        6 Sheets-Sheet 3
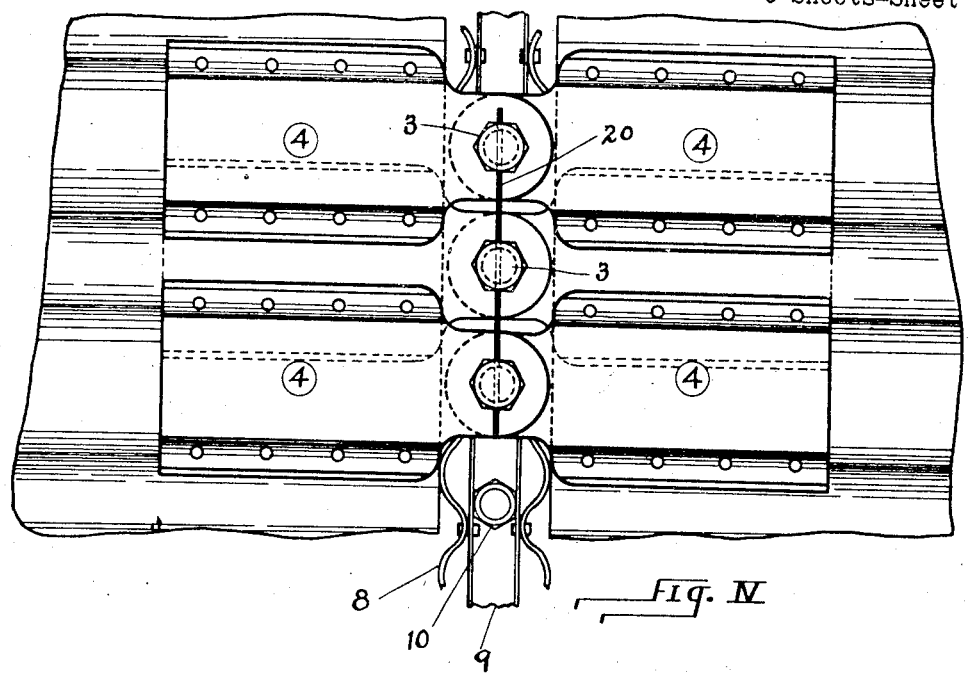
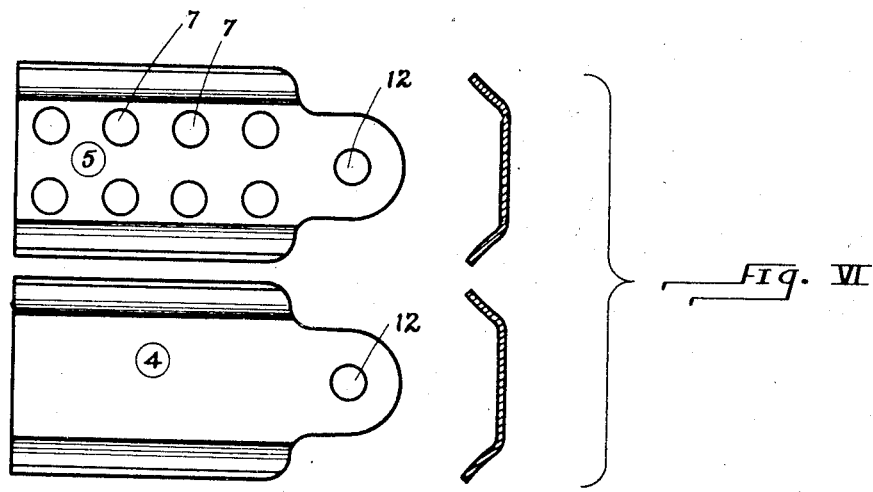
INVENTOR
Harold E. Fox
by Christy Christy and Wharton
his attorneys

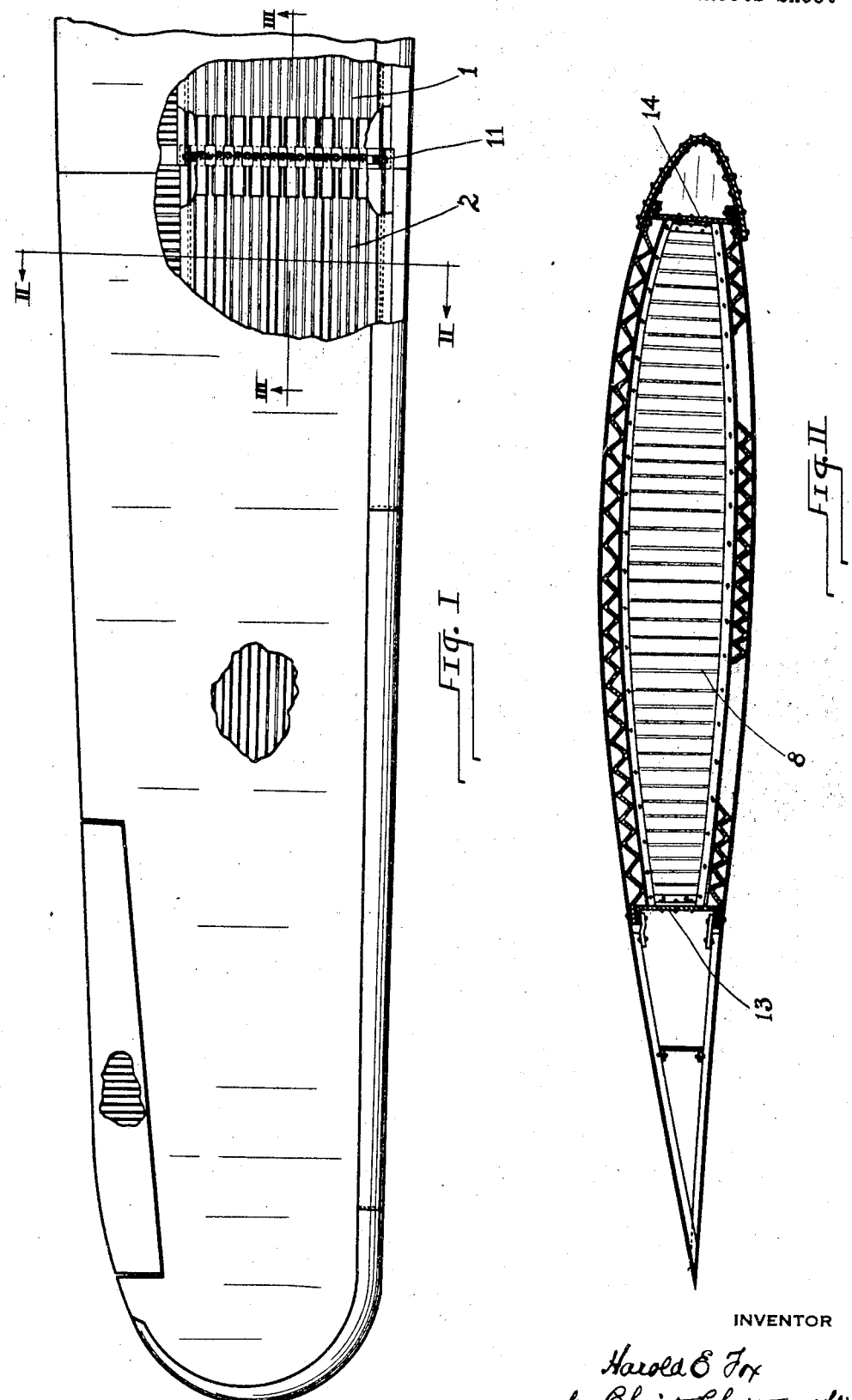

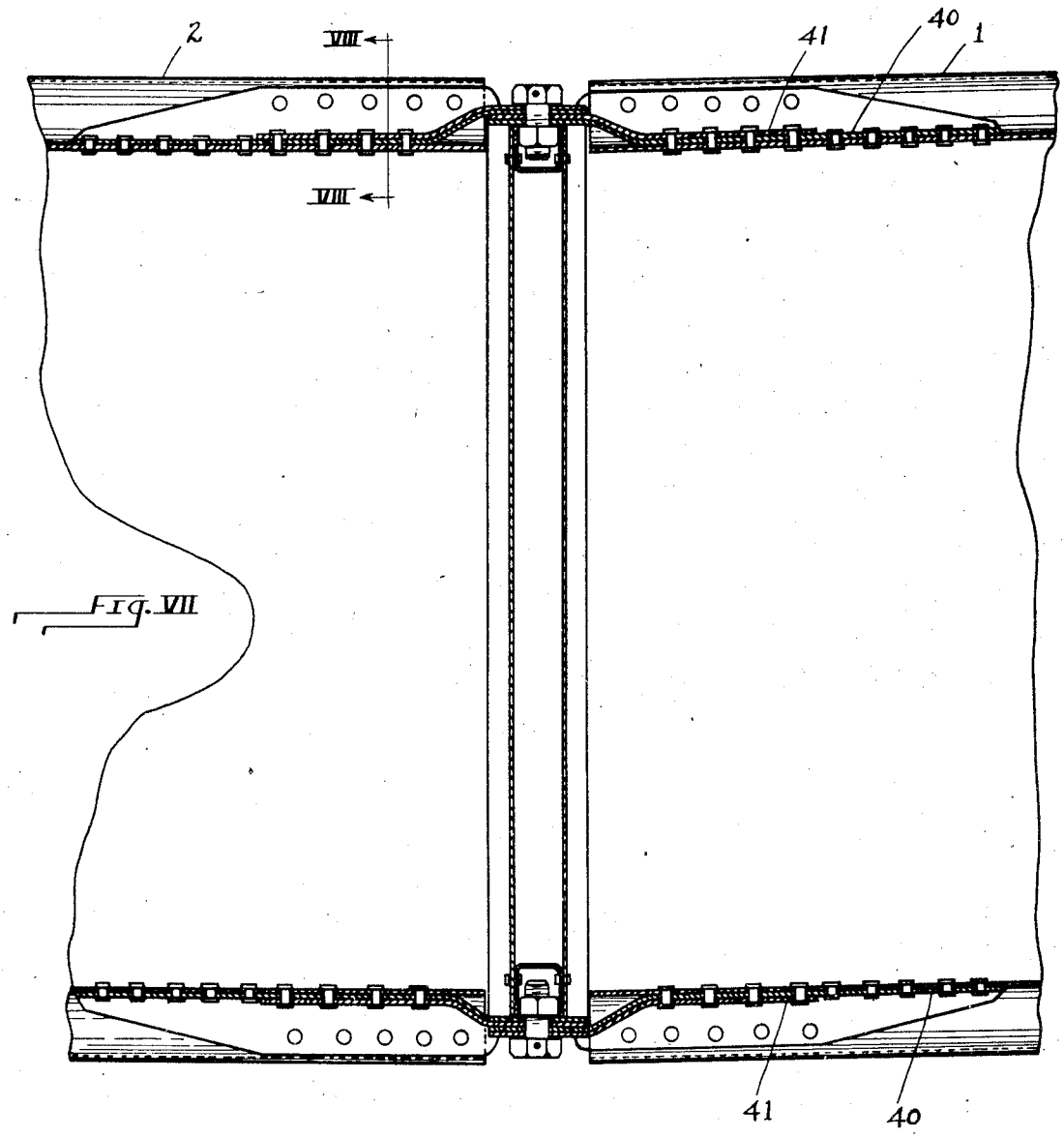
Fig. VII
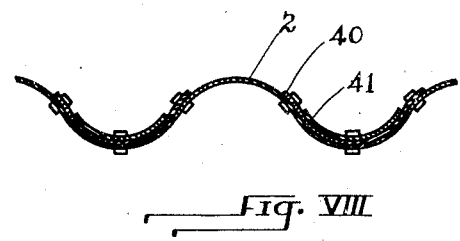
Fig. VIII

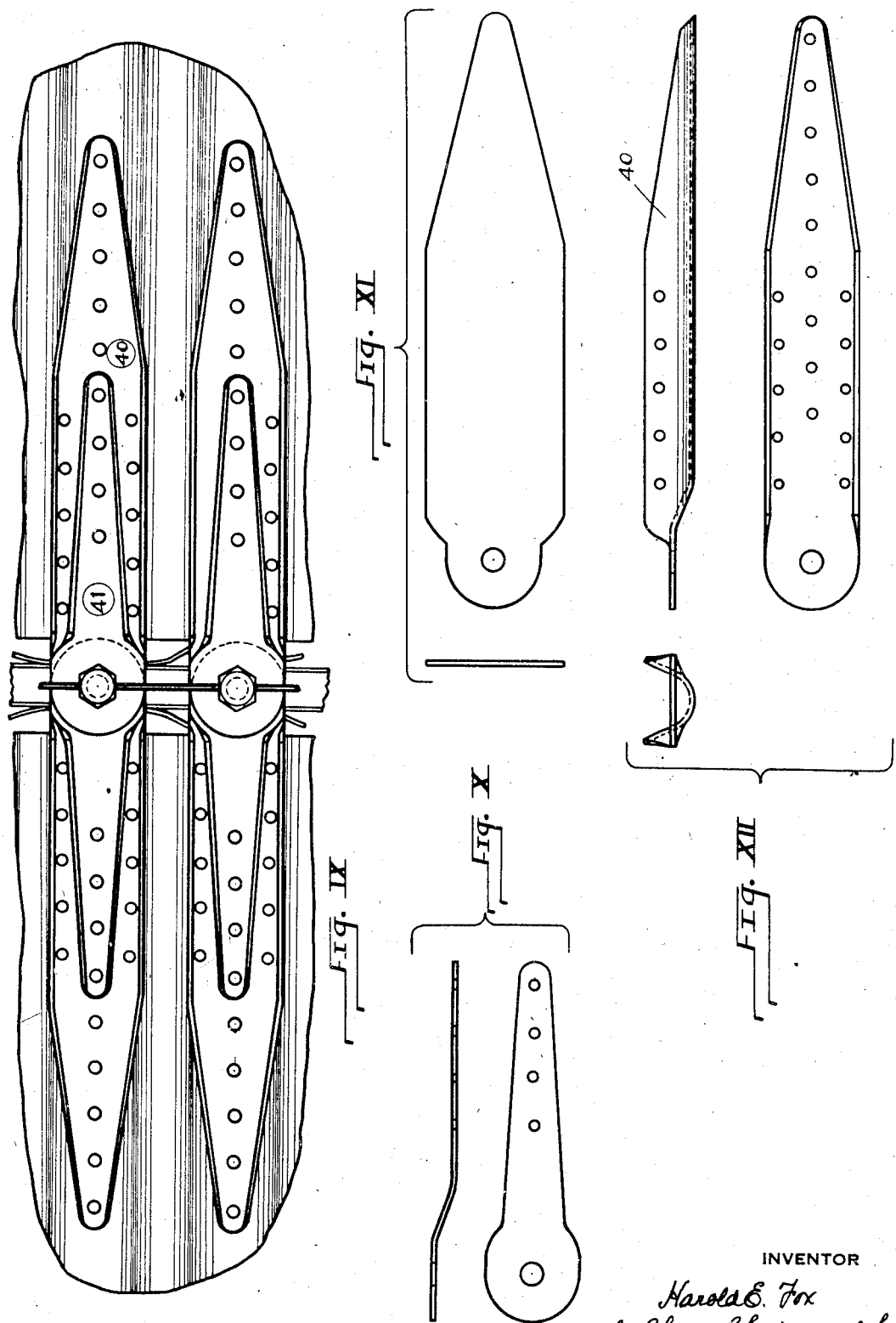

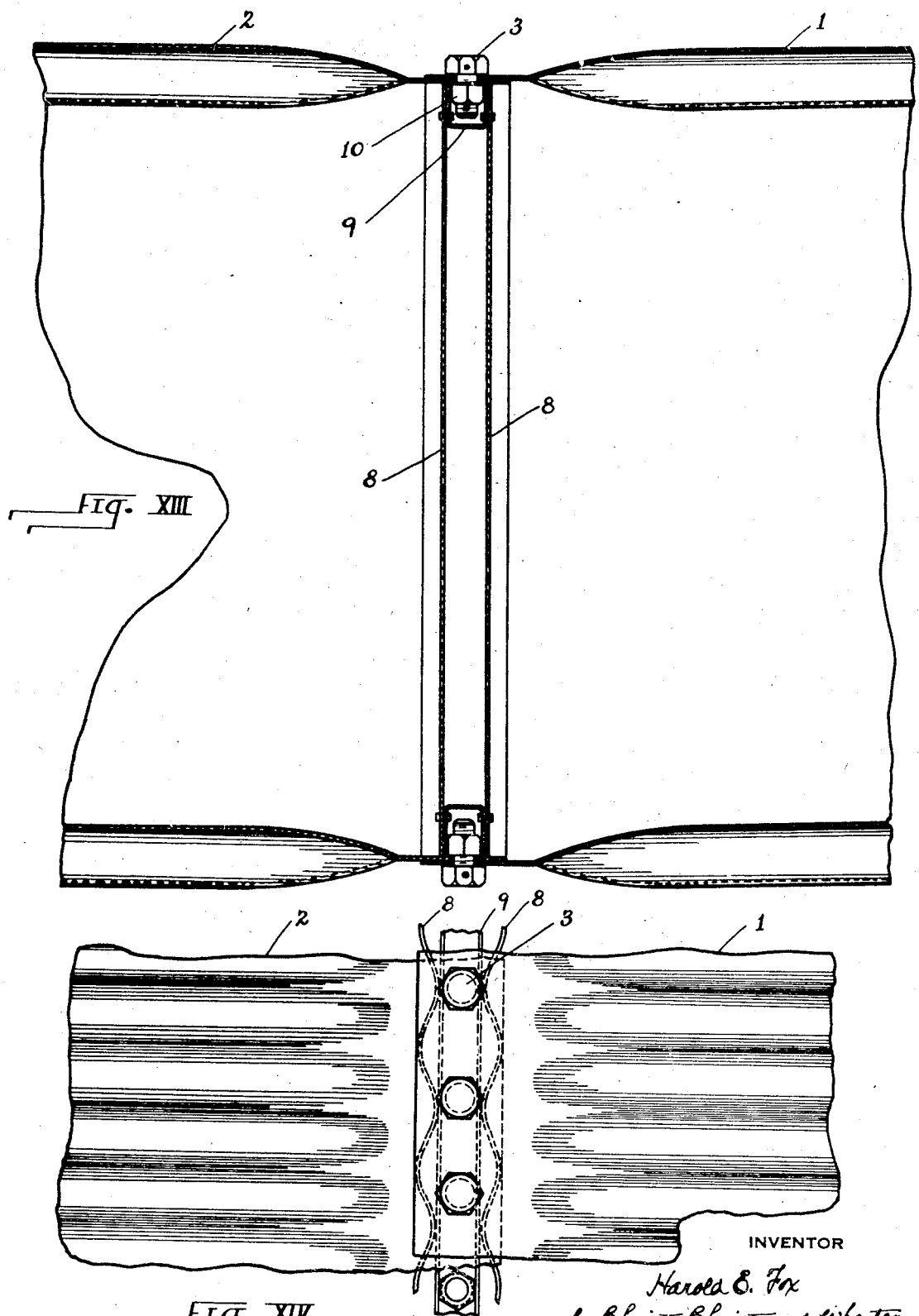

Patented Nov. 10, 1931

1,830,991

UNITED STATES PATENT OFFICE

HAROLD E. FOX, OF PITTSBURGH, PENNSYLVANIA, ASSIGNOR, BY MESNE ASSIGNMENTS, TO GENERAL AVIATION CORPORATION, OF NEW YORK, N. Y., A CORPORATION OF DELAWARE

WING PIN FITTING

Application filed December 30, 1930. Serial No. 505,555.

This invention relates to improvements in corrugated-metal structures, and finds practical application in the building of aeroplanes. In an application of Herbert V. Thaden for Letters Patent on aeroplane wing, filed December 11, 1929, Serial No. 413,255, a wing structure for aeroplanes is shown and described, which includes a spar of monocoque type whose shell is formed of corrugated sheet metal. The corrugations extend longitudinally of the spar. The spar is composed of sections; the planes of section are transverse; and the spar includes an inboard portion and an outboard portion. In the uniting of such sections of such a structure this invention may be enjoyed. The objects in view are security of union, together with strength of the structure as a whole.

In the accompanying drawings Fig. I is a fragmentary view in plan from above of an aeroplane wing in the structure of which this invention is found. In this figure the cover of the wing is broken away, more clearly to show the construction of the spar. Fig. II is a view to larger scale and in vertical transverse section of the wing of Fig. I, on the plane indicated at II—II, Fig. I. Fig. III is a fragmentary view in vertical and longitudinal section of the spar portion of the wing of Figs. I and II, the plane of section being indicated by the line III—III, Fig. I, and in this figure the union is shown between adjacent spar sections. Fig. IV is a view in plan from above of the portion of the structure shown in Fig. III. Fig. V is a fragmentary view, to somewhat larger scale, and in section, upon the plane indicated at V—V, Fig. III. Fig. VI shows in plan and in transverse section two plates which in complementary series and in association with rivets and bolts constitute the section-uniting members. Figs. VII, VIII, and IX are views similar to Figs. III, V, and IV, respectively, illustrating a modification, and Figs. X, XI, and XII illustrate the plates which in this modification are the counterparts of the plates of Fig. VI of the preferred form. Figs. XIII and XIV are views similar to Figs. III and IV and illustrate a further modification.

Referring first to Fig. I, the aeroplane wing there shown will be seen to include a spar made up of an inboard section 1 and outboard section 2. The wing is of monocoque type, and the shell of the spar will be seen to be formed of sheet material (ordinarily of a metal alloy of light weight), corrugated longitudinally of the wing. This shell is supported upon bulk heads or brace members 8, as best seen in Fig. II; and these bulkheads are preferably formed essentially of corrugated sheets of metal, and the corrugations extend vertically.

As best shown in Figs. III and IV, the sections 1 and 2 are united by means of bolts 3; the bolts pass through the overlapping extremities of plates 4, 4 and 5, 5 which plates are rigidly secured to the corrugated sheets which constitute the shell portions of adjacent spar sections. The plates themselves when applied constitute an anchorage device, for securing the structure, section to section. The shape of the plates in plan is shown in Fig. VI and the shape in cross-section in Fig. V. They are applied oppositely to the upper and nether surfaces of the shell; the plates 4 to one surface (in this instance the upper surface), and the plates 5 to the opposite (and in this instance the nether) surface. The plates of the two sets are alike in transverse profile; they include each a medial web portion and marginal portions bent aside from the medial portion and conforming in spacing and in curvature to the surfaces of the corrugated shell 1 (2) to which they are applied. In the assembly the medial webs of the plates 4 and 5 which make up the two series extend in a common plane, and this plane is the medial plane with respect to the corrugations of the shell to which the plates are applied. The plates are secured by rivets 6 through their marginal flanges to the shell, and the lines of rivets (in this case eight rivets for each plate, arranged in two lines) are arranged adjacent the medial plane of the corrugations, with paired lines of rivets arranged on opposite sides of that medial plane. This arrangement insures even distribution of load, and avoids any unbalanced condition of stress, such as to induce bending of the shell plate. This arrangement and its effect will be manifest on considering Fig. V.

The riveting to place of one of the plates 4 (or 5) covers the trough of a corrugation and, but for provision to overcome the difficulty, screens the trough from the access which is necessary to the riveting in place of the next adjacent plate 5 (4) of the companion series. Accordingly, the plates of one of the series (in this case the plates 5) are provided with double rows of orifices 7, which in the assembly come to alignment with the positions of the rivets by which the plates 4 are secured. Through these orifices the desired access is had for purposes of effecting union.

Riveting is specified as the method of union, and this is today the preferred method; manifestly, however, it is in some sense an exemplary method here, and an adequate method of welding is a manifestly possible alternative.

In Fig. III the unions of both the upper and the lower webs of the shell are shown, and it will be observed that in both unions the two sets of plates of one section (in this case the inboard section) overlie the two sets of plates of the other (the outboard) section. This arrangement facilitates assembly, in that snugness of fit with close tolerances is not required, as would be the case if the overlaps were reversed above and below.

In the plane of the union, between the two spar sections, and transversely of the spar extends a bulkhead or brace member 8. This member also is advantageously formed of corrugated metal, and preferably of two sheets 8 of corrugated metal, the corrugations extending vertically. The corrugated sheets carry peripherally a channel 9. In this channel nuts 10 are set at properly spaced intervals, and these nuts are welded or otherwise secured in place. Into nuts 10 the bolts 3, which are introduced through the aligned eyes 12 formed in the overlying ends of plates 4, 4 and 5, 5 of the assembled sections, are screwed. And when the bolts are in place they may be secured by safety wires 20 driven into aligned drill-holes of adjacent bolt heads.

The bulkhead 8, 8 here serves a double function; it is essentially a brace or truss member, and, additionally, it serves as a bolt anchorage. This arrangement, under test, has proved very efficient, particularly in that the load is uniformly distributed over the entire extent of the shell, so that the union is as strong on this as on other transverse planes; and, by so combining functions, lightness is attained in combination with security.

The corrugated sheets 8 of which the bulkheads are essentially composed extend fore and aft between vertical shear members 13 and 14 which extend longitudinally of the spar. These vertical shear members also are formed of sheet metal; at the ends of the sections these members are extended and in the assembly they overlap, as indicated at 11, Fig. I; their overlapped ends are bolted; and the nuts rest in the channel at the vertical edges of the corrugated sheets 8, 8, in like manner as the nuts of the bolts for plates 4 and 5 rest in the channel along the upper and lower edges of sheets 8, 8.

The modification illustrated in Figs. VII—XII is that plates 40 are applied to one surface only of the corrugated shell. The blank of which a plate 40 is shaped is indicated in plan in Fig. XI; it is shaped, as shown in Fig. XII, to conform throughout all its transverse extent to the shell corrugation; and it is applied and riveted to the shell, as shown in Fig. VIII. It is reenforced medially and from the outer end inward by a second plate 41. The blank of which a plate 41 is shaped is illustrated in Fig. X; and its shaping and securing, together with plate 40, to the shell will be understood on considering Fig. VIII.

The modification illustrated in Figs. XIII and XIV consists in forming the adjacent edges of two shell sections (otherwise corrugated) flat, in causing these flat edges to overlap, and in bolting them to the bolt-seats arranged peripherally in the bulkhead. That is to say, the invention here is enjoyed in the forming of the bulkhead and in providing it peripherally with bolt seats for the securing of the meeting edges of the shell sections.

Fig. XIII serves further to show that the overlap of the meeting edges of the shell sections may if preferred be reversed above and below; that is to say, as here shown, in the upper seam the section 1 overlies the section 2, and in the lower seam it is section 2 which is the overlying one.

I claim as my invention:

1. An anchorage device for a corrugated sheet including two sets of plates applicable, one set to one side and the other set to the other side of the sheet, with protruding ends, each plate including a medial web and bent-aside lateral margins, the medial webs of the assembled plates extending in common plane, which is the mid-plane with respect to the crests and troughs of the corrugations, and the margins of the plates engaging the adjacent surfaces of the corrugated sheet, the plates being adapted to be united in their margins to the sheet, the protruding ends of the plates being adapted to be engaged by securing means.

2. The structure of claim 1, the plates of one set being provided in their medial webs with access-affording orifices.

3. Securing means for uniting two corrugated sheets assembled edge to edge, such means including two sets of plates for each of the two sheets and applicable, one set to one side, the other set to the other side of the sheet, with protruding ends, each plate including a medial web and bent-aside lateral margins, the medial webs of the assembled plates extending in common plane, which is the mid-plane with respect to the crests and troughs of the corrugations, and the margins of the plates engaging the adjacent surfaces of the corrugated sheet, the said plates being adapted to be united in their margins to the sheets and the protruding ends of the plates being adapted to overlap the protruding ends of the plates similarly secured to the adjacent sheet, the so overlapping ends being adapted to be united together.

4. In an aeroplane a shell structure formed of corrugated sheet metal and composed of a plurality of sections separable on a plane transverse to the direction in which the corrugations extend, an anchorage device including two sets of plates applicable, one set to one side and the other set to the other side of the sheet, with protruding ends, each plate including a medial web and bent-aside lateral margins, the medial webs of the assembled plates extending in common plane, which is the mid-plane with respect to the crests and troughs of the corrugations, and the margins of the plates engaging the adjacent surfaces of the corrugated sheet, the plates being adapted to be united at their margins to the sheet, the protruding ends of the plates being adapted to be engaged by securing means.

5. In an aeroplane a shell structure formed of corrugated sheet metal and composed of a plurality of sections separable on a plane transverse to the direction in which the corrugations extend, and means for removably securing the sections together, such means including two sets of plates for the edge of each corrugated sheet and applicable, one set to one side, the other set to the other side of the sheet, with protruding ends, each plate including a medial web and bent-aside lateral margins, the medial webs of the assembled plates extending in common plane, which is the mid-plane with respect to the crests and troughs of the corrugations, and the margins of the plates engaging the adjacent surfaces of the corrugate sheet, the said plates being adapted to be united in their margins to the sheets and the protruding ends of the plates united to one section being adapted to overlap the protruding ends of the plates similarly united to the adjacent shell section, and separable uniting members adapted to engage the so overlapping ends.

6. In an aeroplane structure of monocoque type including a shell and supporting bulkheads, and built in sections the assembled shell sections overlapping, a bulkhead with peripheral threaded seats being arranged in the plane in which two sections meet, and bolts uniting the overlapped ends of the assembled shell sections and entering the threaded seats borne by the said bulkhead.

7. In an aeroplane of monocoque type, a shell formed in sections, plates secured to the sections at their edges and in the assembly overlapping, plate upon plate, a bulkhead extending in the plane of meeting of two adjacent sections; bolt seats borne peripherally by the bulkhead, and bolts uniting such overlapping plates and engaged in said bolt seats.

8. In an aeroplane of monocoque type, a sectional shell formed of corrugated metal, the plane of section extending transversely of the direction of the corrugations, plates shaped to conformity to the corrugated surface of the shell and secured to the shell at the edges of the sections and in the assembly overlapping, plate upon plate, a bulkhead extending in the plane of meeting of two adjacent sections, bolt seats borne peripherally by the bulkhead, and bolts uniting such overlapping plates and engaged in said bolt seats.

9. In an aeroplane structure of monocoque type including a shell of corrugated sheet metal and a supporting bulkhead, such structure being sectional, and separable on a plane transverse to the direction in which the corrugations extend, the supporting bulkhead extending in such plane of separation, means for removably securing the sections together, such means including two sets of plates for the edge of each corrugated shell section and applicable, one set to one side, and the other set to the other side of the sheet, with protruding ends, each plate including a medial web and bent-aside lateral margins, the medial webs of the assembled plates extending in common plane, which is the mid-plane with respect to the crests and troughs of the corrugations, and the margins of the plates engaging the adjacent surfaces of the corrugated sheet, the said plates being adapted to be united in their margins to the sheets and the protruding ends of the plates united to one section being adapted to overlap the protruding ends of the plates similarly united to the adjacent section, such overlapping ends being perforate, the said bulkhead being provided peripherally with threaded seats, and bolts adapted to pass through the perforate and overlapped plate ends and to engage the threaded seat borne by the bulkhead.

10. In an aeroplane wing a spar of monocoque type, including a shell and supporting bulkheads, and built in sections, the assembled shell sections overlapping, a bulkhead with peripheral threaded seats being arranged in a plane in which two sections meet, and bolts uniting the overlapped ends of the assembled shell sections and entering threaded seats borne by the said bulkhead.

11. In an aeroplane wing a spar of monocoque type including a shell of longitudinally corrugated metal and supporting transverse bulkheads such spar being built in sections which meet in a transverse plane, and one of the bulkheads being arranged in such plane of meeting, means for removably uniting the sections, such means including two sets of plates for each of two meeting shell edges and applicable, one set to one side and the other set to the other side of the shell edge, each plate having in the assembly a protruding and perforate end, each plate including a medial web and bent-aside lateral margins, the medial webs of the assembled plates extending in common plane, which is the midplane with respect to the crests and troughs of the corrugations, and the margins of the plates engaging the adjacent surfaces of the corrugated shell, the said plates being adapted to be united in their margins to the shell and the protruding ends of the plates overlapping, in the assembly, the protruding ends of the plates similarly secured to the adjacent section, the said bulkhead situated in the plane of meeting being provided peripherally with threaded bolt seats, and bolts extending, when the parts are assembled, through the overlapped and perforated plate ends and removably engaging the threaded seats borne by the bulkhead.

In testimony whereof I have hereunto set my hand.

HAROLD E. FOX.